United States Patent Office 2,776,100
Patented Jan. 1, 1957

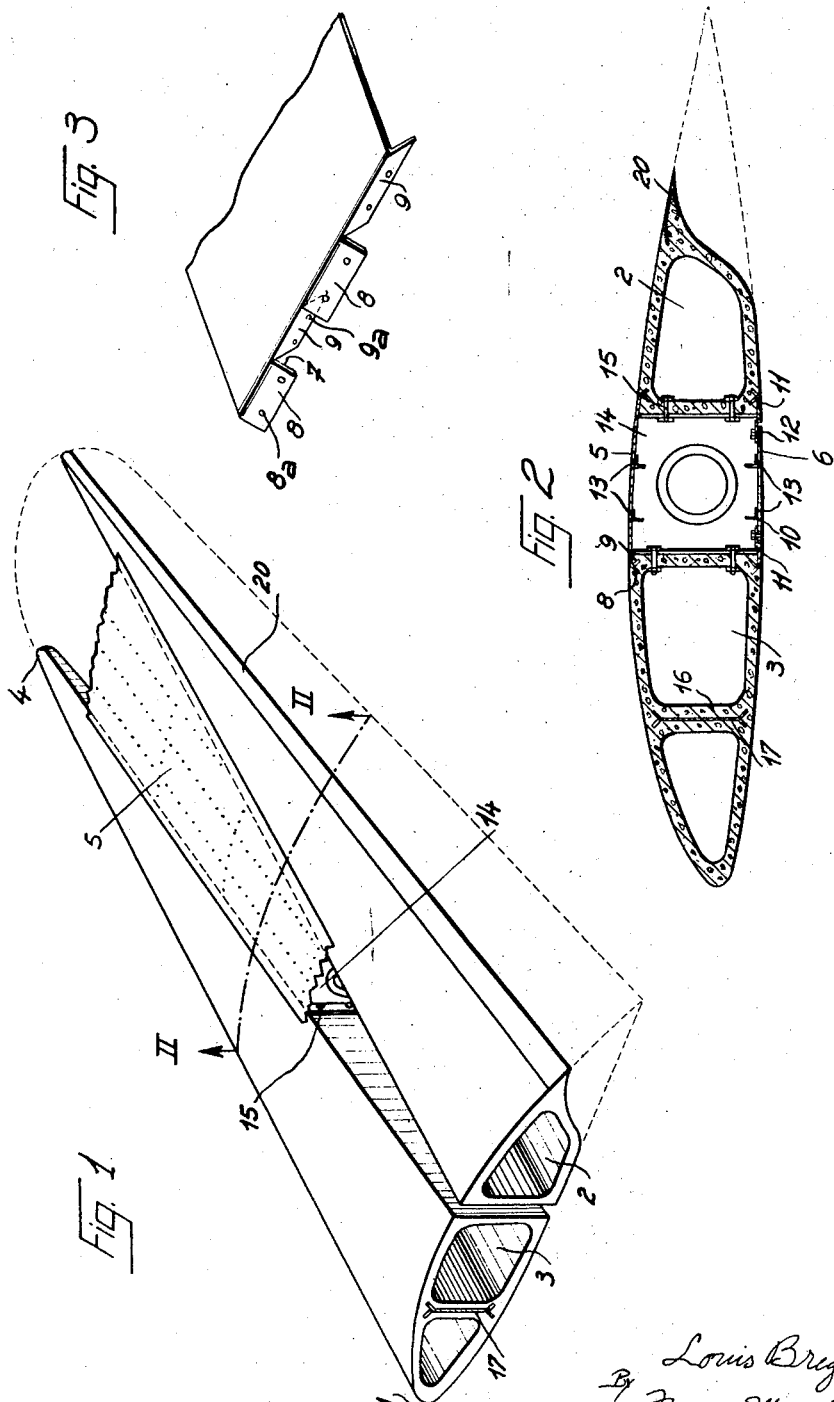

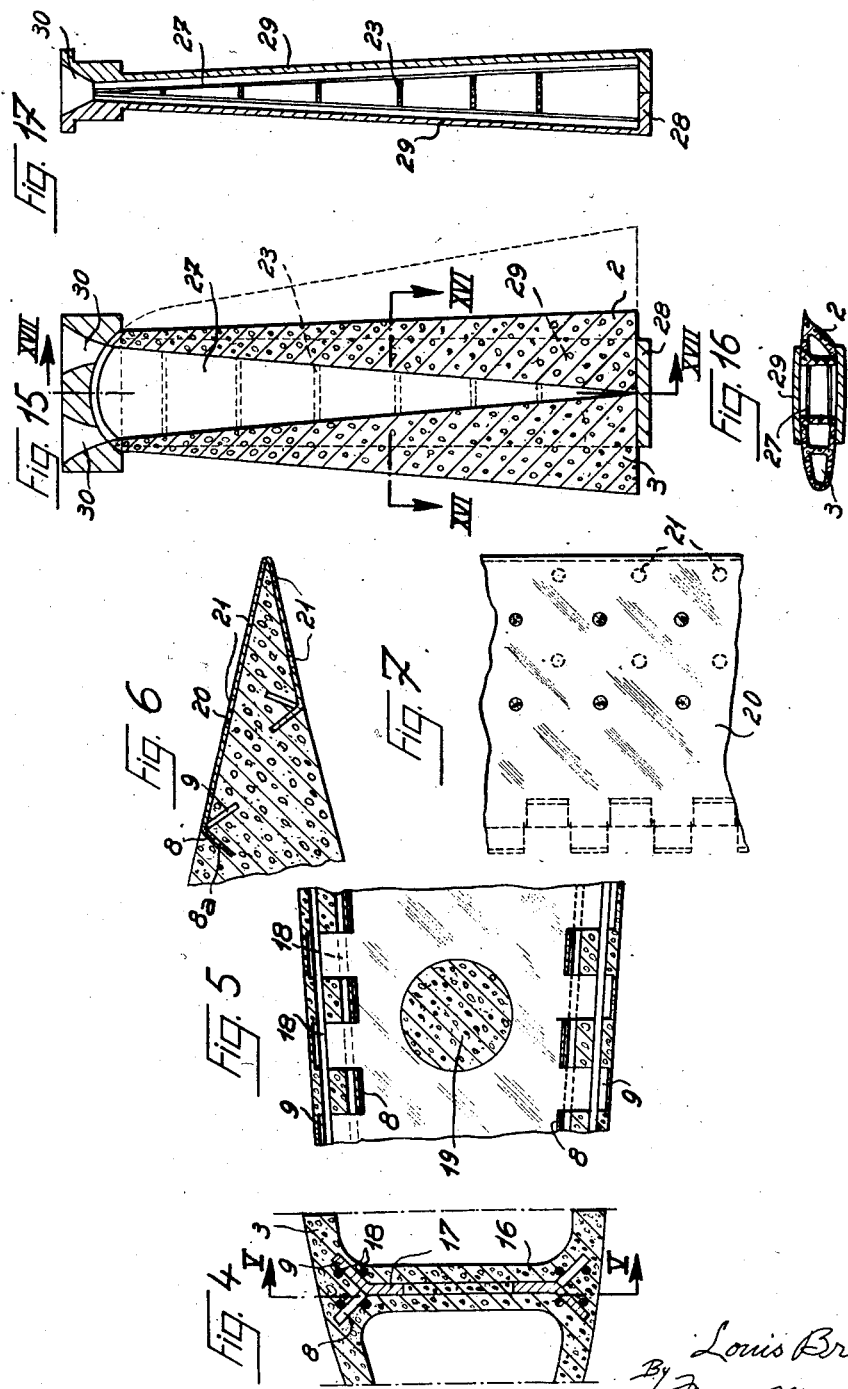

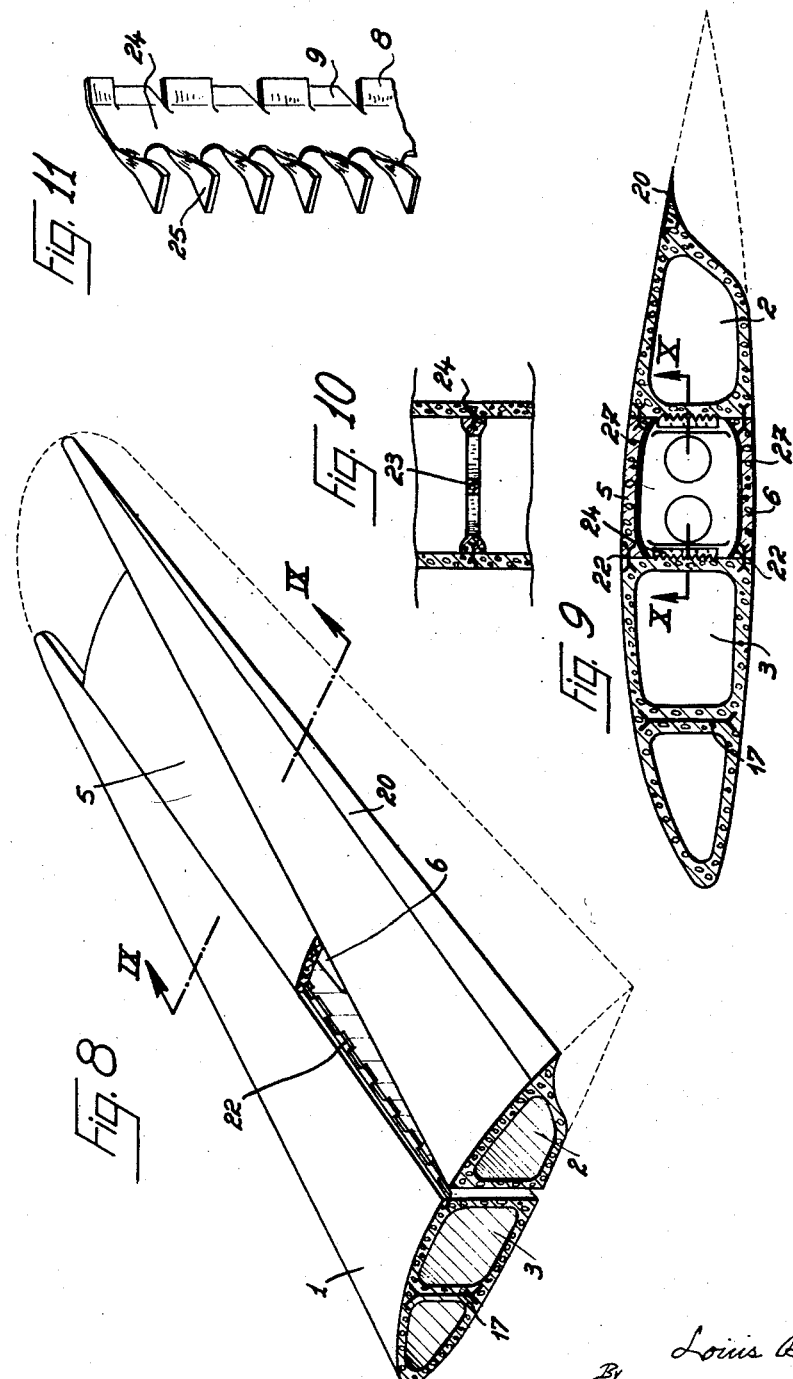

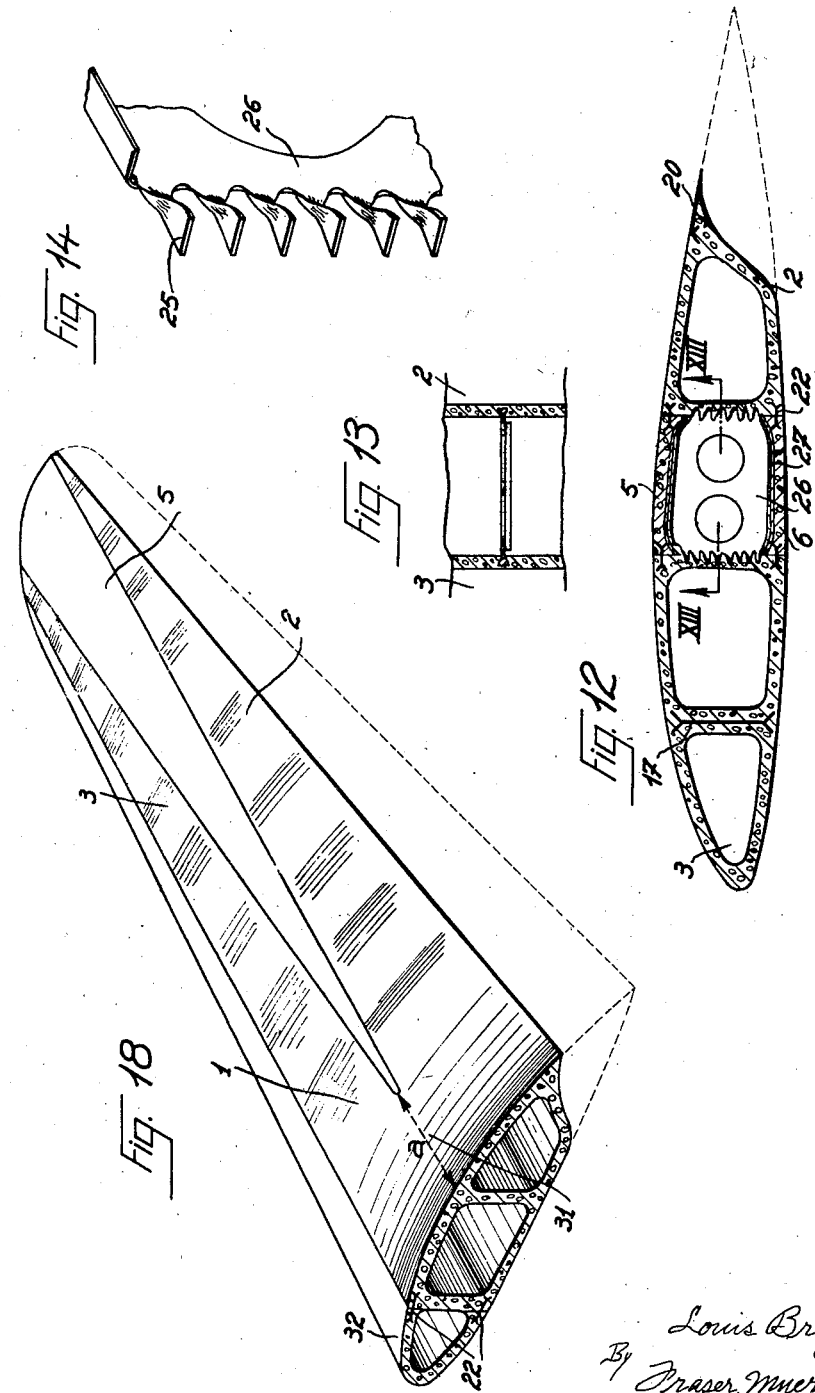

2,776,100

AIRCRAFT STRUCTURAL ELEMENTS AND ESPECIALLY WINGS FROM REINFORCED CONCRETE

Louis Breguet, Paris, France

Application April 15, 1952, Serial No. 282,382

Claims priority, application France April 19, 1951

9 Claims. (Cl. 244—124)

This invention relates to the construction of structural elements for aircraft, and more especially aircraft wings, formed of reinforced concrete; more particularly the invention relates to improvements in the method of constructing aircraft structural elements out of pre-stressed reinforced concrete, described in my French Patent No. 958,272, dated November 21, 1947.

In my said French patent, a method is described of making aircraft structural elements, such as wings, tail fin or empennage structure and other elements of the stressed framework of an aircraft, out of reinforced concrete, wherein the reinforcements, in the form of armature wires, or the like, are pre-stressed by applying a predetermined tension thereto before the concrete is cast therearound.

In one form of construction diagrammatically illustrated in said patent, the wing structure is divided into a plurality of longitudinally extending elements of reinforced concrete adapted to serve as the stressed structure, while the remainder of the wing structure is provided in the form of non-stressed filling means made out of weaker and more lightweight material bridging the gaps in the stressed structure and fulfilling the sole function of providing a continuous outer surface for the element.

It is an object of my present invention to provide an improved concrete wing construction of this last mentioned type.

A general object of this invention is to provide aircraft structural elements such as wings wherein the stressed portions are made of reinforced concrete of the "pre-stressed" type or similar material, while the substantially unstressed portions of the element comprise a lightweight filling or skin covering, in order to obtain maximum strength for minimum over-all weight.

Careful analysis of an aircraft structural element made of reinforced concrete of the so-called "pre-stressed" type, shows that the use of this high strength material throughout the whole extent of the element is unnecessary; and not only that but, owing to the comparatively high specific gravity of such material, such a homogeneous element would attain to unpracticably high over-all weight.

The stresses due to aerodynamic loads acting on a cantilever wing give rise to varying bending moments which reach a maximum adjacent to the root of the wing. The curve of bending moments drops at a very rapid rate as points further away from the root section are considered, and, in spite of the reduction in wing depth, if a uniform structure is maintained in the wing, superabundant sections resulting in great excess of weight are necessarily obtained.

It is an object of this invention to avoid this difficulty, and to provide a wing or other aircraft structural element, wherein the effective cross sectional area of the pre-stressed concrete is reduced or tapered down gradually from the root section at which the maximum bending moments prevail, down to the wing tip section, the gap in the wing structure thus produced owing to the reduction in sectional area of the stressed concrete portion, being filled in or bridged by means of lightweight materials suitably assembled to the stressed material. Thus, an aircraft structural element or wing according to the present invention may comprise two or more longitudinally extending stressed members (preferably in the form of box-members) made of pre-stressed reinforced concrete or similar high strength material, the cross-section area of said members being tapered down from the root towards the tip of said element, and the airfoil contour of the wing being completed by means of suitable lightweight material or skin covering adapted to impart to the wing its requisite unbroken outer surface.

Other objects of the invention lie in the provision of such suitable lightweight covering or filling for a reinforced concrete wing of the type described. The invention, in this connection, comprises the use for this purpose both of sheet metal skin covering and of lightweight concrete compositions.

Further related objects of the invention reside in the provision of suitable means for bonding this filling or skin covering to the adjacent portions of the stressed concrete members. Where the skin covering comprises sheet metal, this bond is preferably made by forming alternately angled castellations in the bonded edge of the sheet metal and imbedding said castellations in the concrete of the stressed members. Where on the other hand the skin covering or filling comprises lightweight cement or the like, the bond is preferably ensured by the provision of intermediate bonding strips having castellations of the kind just mentioned formed in opposite edges thereof respectively imbedded in the stressed concrete member and in the unstressed lightweight concrete covering.

A particularly important object of the invention lies in the provision of suitable stress transmitting means between the spaced tapered stressed concrete members of the wing or similar element. These stress transmitting means may take the form of concrete or sheet metal bulwarks extending between the spaced concrete members transversely of the element, and suitably bonded to said members, as by any of the bonding means described in the foregoing paragraph.

Further objects of the invention reside in various structural improvements and steps of procedure not specifically mentioned hereinabove, but described in the ensuing description.

The invention will now be described, by way of illustration but not of limitation, with reference to some exemplary embodiments thereof illustrated in the accompanying drawings, wherein:

Fig. 1 is a perspective view partly broken away of one form of cantilever wing constructed according to this invention.

Fig. 2 is a section on line II—II of Fig. 1.

Fig. 3 is a partial perspective view of a sheet element showing the castellations formed along one edge thereof for bonding thereof with the concrete.

Fig. 4 shows a detail of Fig. 2 on an enlarged scale.

Fig. 5 is a section on line V—V of Fig. 4.

Fig. 6 is a detail in section on an enlarged scale showing the trailing edge of the wing of Fig. 2.

Fig. 7 is a corresponding partial plan view.

Fig. 8 is a perspective view of a modified cantilever wing construction according to the invention.

Fig. 9 is a section on line IX—IX of Fig. 8.

Fig. 10 is a section on line X—X of Fig. 9.

Fig. 11 shows a detail of a metal strip serving to anchor the concrete ribs.

Fig. 12 is a section similar to Fig. 9 showing a slightly modified form of the wing shown in Fig. 8.

Fig. 13 is a section on line XIII—XIII of Fig. 12.

Fig. 14 is a perspective view of one end portion of a sheet metal rib or spacer.

Fig. 15 is an elevation showing the construction of the wing of Fig. 8.

Fig. 16 is a section on line XVI—XVI of Fig. 15.

Fig. 17 is a section on line XVII—XVII of Fig. 15, and

Fig. 18 is a perspective view of a form of wing wherein the leading edge is formed as a separate attachment and the stressed wing body is divided in two only from a point spaced outboard from the root section of the wing.

In the construction shown in Figs. 1 to 7, an aircraft wing 1 is made up from hollow box-like pre-stressed concrete elements 2 and 3 tapered in an outboard direction and so shaped that, whereas the airfoil section adjacent the inboard or root end of the wing is substantially completely made up of the sectional areas of the pre-stressed members, towards the outboard or wing-tip end of the wing on the other hand, the members 2 and 3 occupy only a small part of the entire airfoil wing section. In its outboard portion therefore, the wing may be described as possessing a "two-spar" structure.

The space defined between members 2 and 3 is sealed at the upper and under wing surface sides with light-gage metal sheeting 5, 6 respectively, only partly shown in Fig. 1, and illustrated in greater detail in Figs. 2 and 3.

These sheet elements, it will be understood, must be so bonded to the concrete wing members that the bond will be strong enough to take up completely the shear stresses transmitted to the sheeting; moreover, said bond should be so designed that any dimensional variations in the members 2 and 3, that may arise due to the pre-stressing treatment and to the setting of the concrete, will be taken up without subjecting the sheeting to permanent distortion resulting in bumps, waviness and the like.

To this end, as shown in Fig. 3, the edge section of the sheeting which is to be anchored into the concrete may be formed with a series of spaced slots 7, such as saw-cuts, defining a plurality of flanges or castellations 8 and 9, alternate ones of these flanges being bent at different angles symmetrically to either side of a common medial plane, which plane may, as shown, extend substantially at right angles to the plane of the main surface of the sheeting.

The provision of flanges or castellations 8, 9 exerts both a local stiffening effect adapted to prevent distortion of the sheeting and also makes for a firm bond uniformly distributed along the length of the concrete member. The bonding effect of flanges 8, 9 may be further enhanced by forming them with apertures or bosses 8a, 9a.

In the form of construction shown, the upper wing surface sheeting 5 is provided in the form of a sheet element directly bonded to the concrete box members 2 and 3, whereas the covering element 6 on the under wing surface is in the form of a panel 10 secured to strips 11 which in turn are anchored in the concrete in the manner just described. Panel 10 is preferably assembled to the strips 11 by means of screws 12, whereby said panel is readily removable.

The metal sheetings 5 and 6 are suitably stiffened, for example by means of the longitudinal stiffeners or strakes 13, and transverse ribs or bulkheads 14. These ribs or bulkheads (Fig. 2) are preferably secured to members 2 and 3 by means of bolts 15.

If desired, longitudinally extending concrete partitions may be provided within the box members 2 and 3, such as the partition 16 shown within the member 3. The partition is preferably reinforced with a thin-gauge sheet metal web 17 having castellated flange portions 8 and 9 alternately angled to either side of the plane of said web. Assuming for example that the concrete box-member 3, in the area of the partition 16, is reinforced by means of a bunch of pre-stressed steel wires 18, four to a bunch for example, then the flanges 8 and 9 are preferably inserted in between the individual wires, as shown in Fig. 4, so as to provide an interengagement between the flanges and the reinforcing wires. Moreover, lightening apertures 19 are preferably formed in the sheet element 17, the apertures serving at the same time to ensure a proper bond between the concrete of the partition on either side of the sheet element 17.

In aircraft wing and similar structures of the type herein contemplated, the trailing edge angles are usually very small, especially in the case of very thin airfoil contours. This would make it difficult, when molding the concrete box-members such as 2, for a satisfactory contour to be properly maintained.

To overcome this difficulty, the invention contemplates covering the trailing edge of the concrete wing member 2 with a sheet member 20 bent to the desired angle and formed, along its edges, with bonding castellations or flanges 8, 9 similar to those described with reference to Figs. 2 and 3. Sheet member 20 ensures that the trailing edge will retain its desired form, and acts moreover to protect it against impacts and the deleterious effect of weather.

The sheet member 20 is placed in the mold and the concrete is then poured. If desired, holes 21 (Figs. 6 and 7) may be formed in the sheet 20 to allow egress of air during the pouring operation, and ensure that the V-space of the sheet will be completely filled in.

A fighter craft wing actually designed and constructed according to the teachings of the invention, the design specifications used being those prescribed for acrobatic flight, has proved the fact that superabundance of materials along the entire span of the wings can thus be completely eliminated. Comparison of the weight of such a wing with the weight of a wing of identical design characteristics but of conventional light metal construction, shows that there is only a negligible difference in weight between the two. This can be accounted for by the fact that the construction using pre-stressed concrete box-members having comparatively thick wall sections, prevents the possibility of local buckling occurring and eliminates the requirements for rivet holes, highly objectionable in tensioned elements, and reduces the number of ribs or other local reinforcing members used; at the same time it affords the possibility of using the so-called equal resistance design, owing to the high rigidity of the pre-stressed concrete, the use of which reduces the sag under load to about one third of its usual value.

In a modified construction, illustrated in Figs. 8 to 14, the additional wall or cover elements 5 and 6 interconnecting the concrete box-members 2 and 3 of the wing 1 are made out of lightweight material such as light-weight concrete, of the kind produced, for example, by incorporating into the concrete mix suitable chemicals adapted to impart a porous structure to the resulting concrete when set, or alternatively by the use of lightweight aggregates. Such concrete will of course have a lower strength than compact concrete, but it will be understood that this is immaterial inasmuch as the great majority of all the stresses are taken up by the box members 2 and 3.

As shown in Figs. 8, 9 and 12, the lightweight concrete members 5 and 6 are bonded to the concrete of the pre-stressed box-members 2 and 3 by means of anchor strips 22 provided on their lengthwise edges with castellations similar to 8, 9 alternately bent to either side of the plane of the strips. The strips are incorporated in the members 2 and 3 during the molding operation.

Further provided between the wall members 5 and 6 are transverse bulkheads or braces serving to interconnect the box members 2 and 3 and to prevent the application of shear to the wall members 5 and 6, whereby the latter serve merely the function of a skin covering.

The bulkheads may be concrete, preferably pre-stressed, as shown at 23 in Figs. 9 and 10. For bonding the ribs 23 to the sides of box members 2 and 3, anchor strips 24 (Fig. 11) formed with castellations along their longitudinal edges are imbedded in the members. The castellations of the edge imbedded in the bulkhead may be similar to the castellations 8, 9 previously described, while those imbedded in the box members as at 25 (Fig. 11) are preferably twisted 90° in order to avoid interference with the concrete as the latter is cast into the box members.

In the modifications shown in Figs. 12 to 14, the bulkheads 26 are made of metal sheeting similar to the bulkheads 14 in the first described form of embodiment, and they may be bolted to the box-members, especially if they are to withstand comparatively high stresses, or they may be directly anchored in the concrete, as through the castellations 25 similar to those described with reference to the preceding example.

Figs. 15 to 17 illustrate by way of example one method of constructing the lightweight concrete wall elements 5 and 6.

After having first interconnected the pre-stressed concrete box members 2 and 3 by suitable transverse ribs or bulkheads, such for example as 14, 23 or 26, provided with anchor strips 22, two lightweight web elements 27, made of plywood or similar material, are placed over said bulkheads, to serve as lost cores in the casting operations (as shown in Figs. 9 and 12).

About the members 2 and 3 a mold assembly is then mounted which comprises an end wall 28 and two halves 29, the upper part of which, for example, may be formed with one or more pouring funnels 30 for filling the mold with lightweight concrete.

Fig. 18 illustrates a modification of the wing construction described hereinabove with reference to Figs. 8 to 17, wherein the pre-stressed concrete wing structure 31, rather than being divided into two members separate from each other throughout the whole span of the wing, comprises instead an integral section *a* adjacent to the root of the wing, the separation into two members 2, 3 commencing only beyond the area *a*. The space or gap between the branches 2 and 3 of the concrete wing may be sealed in any of the ways previously described, for example with a lightweight concrete filling.

Further in the exemplary construction shown in Fig. 18, the leading box member or branch of the wing structure 31 is shown as displaced or spaced rearwards from the leading edge of the wing, there being provided a leading edge portion 32 made e. g. of lightweight concrete bonded to the stressed member 3 by means of anchor strips such as the strips 22 previously described. This arrangement makes it possible to locate the stressed partition of the pre-stressed concrete box member in an area nearer to the mid-portion of the airfoil section, wherein greater vertical chord dimensions are available.

It will of course be understood that modifications may be made in the structural features of the invention illustrated and described without exceeding the scope of protection of the ensuing claims.

What I claim is:

1. An aircraft structural element which comprises a pair of spaced tapered reinforced concrete hollow box members extending longitudinally of the element, stress-transmitting means interconnecting said members transversely of the element, lightweight concrete elements bridging the space between said members adjacent the respective opposite surfaces of the element and providing non-stressed skin means for imparting an unbroken surface to the element and anchor strips for bonding said bridging elements to the adjacent portions of said members, said strips having one side thereof bonded in the concrete of said members and the other side thereof bonded to said bridging elements.

2. An aircraft structural element according to claim 1, wherein the stress transmitting means comprises spaced sheet metal bulkhead means extending across the space between the box members and bonded to facing portions of said members for transmitting stresses therebetween.

3. Structural elements as claimed in claim 2 wherein said bulkhead means have opposite edges thereof imbedded into facing portions of the concrete of said box members.

4. An aircraft structural element according to claim 1, wherein the stress transmitting means are spaced reinforced concrete bulkhead means extending across the element and bonded to facing portions of said members for transmitting stresses therebetween.

5. An aircraft structural element as claimed in claim 4 which further comprises bonding strips having one side thereof imbedded in the facing portions of said box members and opposite sides thereof imbedded into said bulkhead means for bonding the latter to the former.

6. In an aircraft structural element as claimed in claim 1, wherein the anchored means for bonding said reinforced concrete box members to said lightweight concrete bridging elements comprises, at least one bonding strip having its opposite sides formed with spaced slots to define adjacent flanges therein, said flanges being alternatively bent by equal amounts to opposite sides of the general plane of said strip and said opposite sides being respectively imbedded in said reinforced concrete box member and in said lightweight concrete bridging element.

7. An aircraft element which comprises a pair of spaced tapered reinforced concrete hollow box members extending longitudinally of said element, a preformed sheet metal member covering the longitudinal outer edge of at least one of said box members, said sheet metal member having its edges anchored in the concrete of the box member and being adapted to define the corresponding edge of the element and to provide an unbroken surface with the remaining part of said box member, spaced stress transmitting bulkhead means extending across the space between and interconnecting said box members transversely of the element and non-stressed surface filling means having their longitudinal edges anchored to the concrete of said members and bridging the space between said box members for presenting a continuous surface area to aerodynamic forces exerted on the element.

8. An aircraft wing element comprising a pair of stressed reinforced concrete hollow box members extending longitudinally of said wing, each member tapering from the wing root to the wing tip and the spacing between the members increasing from said root to said tip, a preformed sheet metal member covering the longitudinal outer edge of at least the trailing one of said box members, said sheet metal member having its edges anchored in the concrete of the box member and being adapted to define the corresponding edge of the element and to provide an unbroken surface with the remaining part of said box member, spaced stress transmitting bulkhead means extending across the space between and interconnecting said box members transversely of the element and non-stressed surface filling means having opposite edges anchored to the concrete of said box members and bridging the space between said members for presenting a continuous surface area to aerodynamic forces exerted on the element.

9. Aircraft wing as claimed in claim 8, wherein said anchored edges of the sheet metal member comprise castellations defined by spaced slots extending from said edge normally thereto, said castellations being alternately angled at equal amounts to opposite sides of an intermediate plane generally normal to the general plane of the concrete surface of said box member and imbedded in said surface to provide a firm bond therewith.

References Cited in the file of this patent

UNITED STATES PATENTS

| | | |
|---|---|---|
| 1,272,139 | Stanley | July 9, 1918 |
| 1,457,844 | Leitner | June 5, 1923 |
| 1,567,245 | Collier et al. | Dec. 29, 1925 |
| 1,793,775 | Charavay | Feb. 24, 1931 |
| 2,106,761 | Roberts et al. | Feb. 1, 1938 |
| 2,183,158 | Bennett | Dec. 12, 1939 |
| 2,567,124 | Roberts | Sept. 4, 1951 |

FOREIGN PATENTS

| | | |
|---|---|---|
| 126,430 | Great Britain | May 1, 1919 |
| 356,154 | Germany | July 12, 1922 |
| 505,912 | France | May 17, 1920 |
| 958,272 | France | Sept. 12, 1949 |